United States Patent

Ogata

(10) Patent No.: US 7,615,950 B2
(45) Date of Patent: Nov. 10, 2009

(54) CONTROL DEVICE FOR HYBRID ELECTRIC VEHICLE

(75) Inventor: Makoto Ogata, Kanagawa (JP)

(73) Assignee: Mitsubishi Fuso Truck and Bus Corporation, Kanagawa (JP)

( * ) Notice: Subject to any disclaimer, the term of this patent is extended or adjusted under 35 U.S.C. 154(b) by 427 days.

(21) Appl. No.: 11/712,500

(22) Filed: Mar. 1, 2007

(65) Prior Publication Data

US 2007/0163821 A1    Jul. 19, 2007

(30) Foreign Application Priority Data

Mar. 1, 2006    (JP)    ............... 2006-054848

(51) Int. Cl.
*H02P 7/00*    (2006.01)
(52) U.S. Cl. ............... 318/432; 318/433; 318/434; 318/139
(58) Field of Classification Search ............... 318/432, 318/433, 434, 139; 180/65.26, 65.27; 701/84
See application file for complete search history.

(56) References Cited

U.S. PATENT DOCUMENTS

2006/0161328 A1 * 7/2006 Hoshiba et al. ............... 701/84

FOREIGN PATENT DOCUMENTS

JP    05 176405    7/1993

* cited by examiner

*Primary Examiner*—Karen Masih
(74) *Attorney, Agent, or Firm*—Jacobson Holman PLLC

(57) ABSTRACT

Driving forces of an engine and an electric motor can be transmitted to driving wheels, and the engine and the driving wheels can be mechanically connected and disconnected by a clutch. A vehicle ECU disengages the clutch and controls the motor to generate a required torque when an upper limit torque generable by the motor is equal to or above the required torque. On the other hand, the ECU engages the clutch and controls the engine and the motor in such a manner that a sum of the torques of the engine and the motor becomes the required torque when the upper limit torque is lower than the required torque. The ECU engages the clutch even if the upper limit torque is equal to or above the required torque when the revolution speed of the motor becomes equal to or above a predetermined revolution speed during traveling of the vehicle.

4 Claims, 4 Drawing Sheets

CONTROL DEVICE FOR HYBRID ELECTRIC VEHICLE

BACKGROUND OF THE INVENTION

1. Field of the Invention

The present invention relates to a control device for a hybrid electric vehicle, and more particularly to a control device for a hybrid electric vehicle capable of transmitting each of a driving force of an engine and a driving force of an electric motor to driving wheels of the vehicle.

2. Description of the Related Art

A so-called parallel type hybrid electric vehicle capable of transmitting each of a driving force of an engine and a driving force of an electric motor to driving wheels of a vehicle has been conventionally developed and come into practical use.

As such a parallel type hybrid electric car, for example, Unexamined Japanese Patent Publication No. 5-176405 (hereinafter, referred to as Document 1) has proposed a hybrid electric car in which a clutch that mechanically connects/disconnects an engine to/from an automatic transmission is provided and a rotary shaft of an electric motor is coupled between an output shaft of this clutch and an input shaft of the automatic transmission.

In such a hybrid electric car as disclosed in Document 1, a state where the clutch is engaged to enable transmitting driving forces to driving wheels from both the engine and the electric motor can be switched to/from a state where the clutch is disengaged to enable transmitting a driving force of the electric motor alone to the driving wheels.

For example, when depression on an accelerator pedal is released and the hybrid electric vehicle travels while reducing a speed in a state where a brake of the vehicle is not operated, a decelerating torque that can obtain the substantially same deceleration as that obtained when substantially the same vehicle using an engine alone as a power source performs the same deceleration is set as a required decelerating torque. The electric motor and the engine of the hybrid electric vehicle are controlled so as to obtain this required decelerating torque. At this time, the electric motor operates as a generator to produce a regenerative braking force. The electric motor converts the regenerative braking energy into an electric power and a battery is charged with the converted electric power. In this way, energy recovery at the time of deceleration is effected. Such a required decelerating torque is set greater as the input speed of the transmission, i.e., the revolution speed of the electric motor is higher in order to obtain an adequate vehicle deceleration.

On the other hand, in the electric motor, an upper limit decelerating torque as an upper limit value of a producible regenerative braking torque is set based on specifications of the electric motor. This upper limit decelerating torque has a substantially fixed value in a low revolution speed zone, and is decreased along with an increase in the revolution speed of the electric motor in a high revolution speed zone based on characteristics of the electric motor.

Therefore, at the time of deceleration of a vehicle, there are two occasions, i.e., an occasion where the upper limit decelerating torque becomes equal to or greater than the required decelerating torque and an occasion where the upper limit decelerating torque is smaller than the required decelerating torque. Thus, when the upper limit decelerating torque is equal to or greater than the required decelerating torque, the following operation can be considered. That is, the clutch is disengaged, and the electric motor is controlled so as to obtain the required decelerating torque by using the regenerative braking torque of the electric motor alone, thereby effecting energy recovery during deceleration of the vehicle to a maximum extent. On the other hand, when the upper limit decelerating torque is smaller than the required decelerating torque, the following operation can be considered. That is, the clutch is engaged, and the electric motor and the engine are controlled so as to obtain the required decelerating torque by using both the regenerative braking torque of the electric motor and the decelerating torque of the engine.

Further, in regard to a driving torque when driving a vehicle, an upper limit driving torque as an upper limit of a producible driving torque is determined in the electric motor like the example of the decelerating torque. This upper limit driving torque also tends to be high in a low revolution speed zone of the electric motor and gradually decrease along with an increase in the revolution speed of the electric motor in a high revolution speed zone like the upper limit decelerating torque.

Therefore, at the time of, e.g., vehicle starting acceleration, there are two occasions, i.e., an occasion where the upper limit driving torque becomes equal to or greater than a required driving torque and an occasion where the upper limit driving torque becomes smaller than the required driving torque. Thus, when the upper limit driving torque is equal to or greater than the required driving torque that is necessary for driving a vehicle, the following operation can be considered. That is, the clutch is disengaged so that a driving torque of the electric motor alone can be used to obtain the required driving torque. On the other hand, when the required driving torque is greater than the upper limit driving torque, the following operation can be considered. That is, the clutch is connected so that both a driving torque of the electric motor and a driving torque of the engine can be used to obtain the required driving torque.

However, when a driver releases the accelerator pedal to aim at deceleration traveling on a downward sloping road, the upper limit decelerating torque may become greater than the required decelerating torque if the revolution speed of the electric motor is sufficiently low at the time of releasing the accelerator pedal. In this case, the clutch is disengaged, and regenerative braking of the electric motor alone is used to generate the required decelerating torque. Then, when a traveling speed is gradually increased since a gradient of the downward sloping road is steep, the revolution speed of the electric motor is also increased, and the required decelerating torque is consequently increased. On the other hand, the upper limit decelerating torque may be decreased. In such a case, when the upper limit decelerating torque is reduced below the required decelerating torque, the clutch is engaged. At this moment, the revolution speed of the electric motor may be greatly increased. When the clutch is engaged, the revolution speed of the engine jumps up from the idle speed before the engagement of the clutch.

In this manner, when the clutch is engaged in a state where the revolution speed of the electric motor is increased at the time of traveling down, e.g., a sloping road, the following problem occurs. That is, since the revolution speed of the engine that has calmly driven until this moment is suddenly increased, a driver misconceives that a vehicle has a problem or feels discomfort.

Even in driving a vehicle, when the required driving torque is low during driving at a relatively high traveling speed, the upper limit driving torque may exceed the required driving torque. In such a case, the clutch is disengaged, and the electric motor alone is used to effect driving. When the accelerator pedal is pressed in such a state and the required driving torque is thereby increased, the required driving torque exceeds the upper limit driving torque. Then, the clutch is engaged when the required driving torque becomes greater than the upper limit driving torque. In such a case, the revolution speed of the electric motor may be considerably increased due to high-speed traveling. When the clutch is engaged, the revolution speed of the engine jumps up from the idle speed that is a revolution speed before the engagement of the clutch.

Therefore, in such a case, the following problem occurs. That is, since the revolution speed of the engine that has calmly driven until this moment is suddenly increased, a driver may misconceive that the vehicle has a problem, or may feel discomfort.

SUMMARY OF THE INVENTION

An aspect of the present invention is directed to a control device for a hybrid electric vehicle arranged such that a driving force of an engine and a driving force of an electric motor can be transmitted to driving wheels, and that the engine and the driving wheels can be mechanically connected and disconnected by means of a clutch, comprising: revolution speed detecting means for detecting the revolution speed of the electric motor; and control means for setting an upper limit torque as a torque that is generable by the electric motor in accordance with the revolution speed detected by the revolution speed detecting means, and setting a required torque that should be output from at least one of the engine and the electric motor as a torque required for traveling of the vehicle, wherein the control means disengages the clutch and controls the electric motor to generate the required torque when the upper limit torque is equal to or greater than the required torque, and, on the other hand, engages the clutch and controls the engine and the electric motor in such a manner that a sum of a torque of the engine and a torque of the electric motor becomes the required torque when the upper limit torque is smaller than the required torque, and wherein the control means engages the clutch even if the upper limit torque is equal to or greater than the required torque when the revolution speed detected by the revolution speed detecting means becomes equal to or higher than a predetermined revolution speed during traveling of the vehicle.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

An embodiment of the present invention will be described below with reference to the attached drawings.

Figure 1:
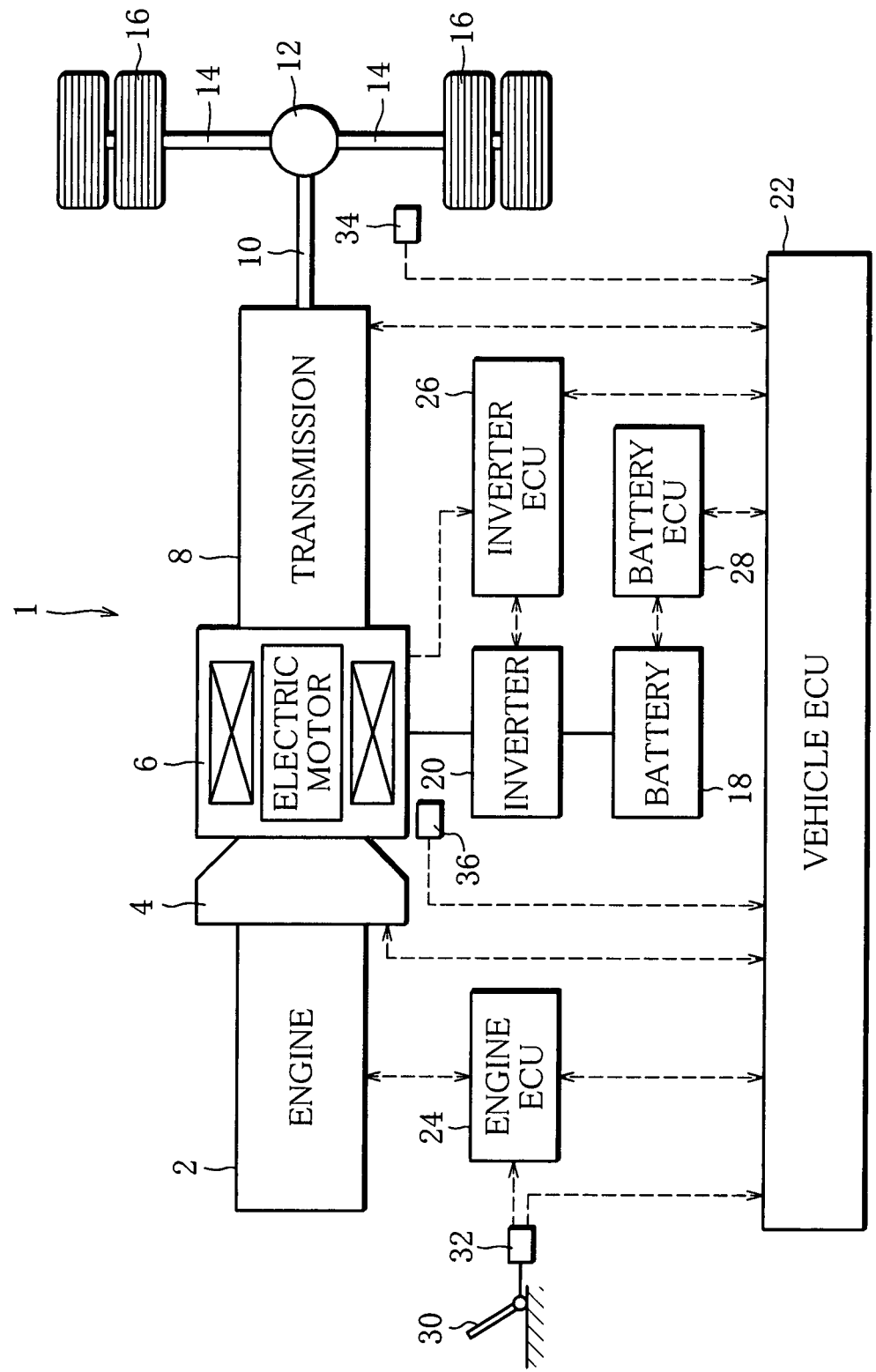
FIG. 1 is a block diagram showing a schematic structure of a hybrid electric vehicle having a control device according to one embodiment of the present invention.

FIG. 1 is a diagram showing a schematic structure of a hybrid electric vehicle 1 to which the present invention is applied.

An input shaft of a clutch 4 is coupled to an output shaft of an engine 2 that is a diesel engine. An output shaft of the clutch 4 is coupled to an input shaft of an automatic transmission (hereinafter, referred to as transmission) 8 having five forward gears (hereinafter, simply referred to as gears) through a rotary shaft of a permanent-magnetic synchronous motor (hereinafter, referred to as electric motor) 6. An output shaft of the transmission 8 is connected to right and left driving wheels 16 through a propeller shaft 10, a differential device 12, and a driving shafts 14.

Therefore, when the clutch 4 is engaged, both the output shaft of the engine 2 and the rotary shaft of the electric motor 6 can be mechanically connected with the driving wheels 16. On the other hand, when the clutch 4 is disengaged, only the rotary shaft of the electric motor 6 can be mechanically connected with the driving wheels 16.

The electric motor 6 is operated as a motor when DC power stored in a battery 18 is supplied to the electric motor 6 after being converted into AC power by an inverter 20. A driving torque of the electric motor 6 is transmitted to the driving wheels 16 after being shifted to proper speed by the transmission 8. At the time of deceleration of a vehicle, the electric motor 6 is operated as a generator. Kinetic energy created by revolution of the driving wheels 16 is transmitted to the electric motor 6 through the transmission 8 to be converted into AC power, thereby producing a decelerating torque based on a regenerative braking force. This AC power is converted into DC power by the inverter 20 and is then charged to the battery 18. In this manner, the kinetic energy created by the revolution of the driving wheels 16 is recovered as an electric energy.

A driving torque of the engine 2 is transmitted to the transmission 8 through the rotary shaft of the electric motor 6 when the clutch 4 is engaged. After being shifted to a proper speed, the driving torque of the engine 2 is transmitted to the driving wheels 16. Accordingly, if the electric motor 6 is operated as a motor while the driving torque of the engine 2 is transmitted to the driving wheels 16, both the driving torque of the engine 2 and the driving torque of the electric motor 6 are transmitted to the driving wheels 16. That is, a part of the driving torque to be transmitted to the driving wheels 16 for driving the vehicle is supplied from the engine 2, and at the same time, the rest of the driving torque is supplied from the electric motor 6.

If a storage rate (hereinafter, referred to as SOC) of the battery 18 is lowered, and the battery 18 then needs to be charged, the electric motor 6 is operated as a generator. Moreover, the electric motor 6 is driven by using a part of the driving torque of the engine 2, to thereby carry out power generation. The AC power thus generated is converted into DC power by the inverter 20, and the battery 18 is charged with this DC power.

A vehicle ECU 22 (control means) performs engagement/disengagement control of the clutch 4 and gear switching control of the transmission 8 in accordance with an operating state of the vehicle, an operating state of the engine 2, and information from an engine ECU 24, an inverter ECU 26 and a battery ECU 28, etc. Moreover, the vehicle ECU 22 carries out integrated control for appropriately controlling the engine 2 and the electric motor 6 in accordance with state of the above-mentioned controls, and the various kinds of operating state, such as starting, acceleration, and deceleration of the vehicle.

The hybrid electric vehicle 1 is provided with an accelerator opening sensor 32 for detecting the depression amount of an accelerator pedal 30, a vehicle speed sensor 34 for detecting the traveling speed of the vehicle, and a revolution speed sensor (revolution speed detecting means) 36 for detecting the revolution speed of the electric motor 6. When performing the above-explained controls, the vehicle ECU 22 calculates a total driving torque required for traveling of the vehicle, and a total decelerating torque to be generated by the engine 2 and the electric motor 6 in deceleration of the vehicle, based on detection results from the accelerator opening sensor 32, the vehicle speed sensor 34, and the revolution speed sensor 36. The vehicle ECU 22 sets a torque to be generated by the engine 2 and a torque to be generated by the electric motor 6 based on the total driving torque and the total decelerating torque.

The engine ECU 24 performs various kinds of controls required for the operation of the engine 2 per se, including start/stop control and idle control of the engine 2, regeneration control of an exhaust gas purifying device (not shown), and the like. Further, the engine ECU 24 controls fuel injection quantity, fuel injection timing, etc. for the engine 2 so that the engine 2 generates the torque required in the engine 2, which has been set by the vehicle ECU 22.

The inverter ECU 26 controls the inverter 20 based on the torque to be generated by the electric motor 6, which has been set by the vehicle ECU 22, and thereby controls the electric motor 6 to be operated as a motor or a generator.

The battery ECU 28 detects the temperature of the battery 18, the voltage of the battery 18, current flowing between the inverter 20 and the battery 18, etc. The battery ECU 28 obtains the SOC of the battery 18 from these detection results, and transmits the obtained SOC to the vehicle ECU 22 together with the detection results.

The outline of controls performed mainly by the vehicle ECU 22, in the hybrid electric vehicle 1 arranged as stated above, to make the vehicle travel is as follows:

First, it is assumed that the vehicle is at rest with the engine 2 stopped. When the driver operates a starter switch (not shown) to start the engine 2, with a shift change lever (not shown) in neutral position, the vehicle ECU 22 confirms that the transmission 8 is in neutral position so that the electric motor 6 and the driving wheels 16 are mechanically disconnected, and that the clutch 4 is engaged. Then, the vehicle ECU 22 indicates to the inverter ECU 26 a driving torque of the electric motor 6 required to start the engine 2, and commands the engine ECU 24 to operate the engine 2.

The inverter ECU 26 operates the electric motor 6 as a motor to generate a driving torque based on the indication from the vehicle ECU 22, thereby cranking the engine 2. At this time, the engine ECU 24 starts supply of a fuel to the engine 2, thereby causing the engine 2 to start. After starting the engine 2, the engine 2 idles.

After the engine 2 is started in the above-described manner, when the vehicle is at rest, the engine 2 is in the idle operation state. When the driver puts the shift change lever in drive position or the like, the clutch 4 is disengaged. Furthermore, when the driver steps on the accelerator pedal 30, the vehicle ECU 22 sets a driving torque of the electric motor 6 required to start traveling of the vehicle in accordance with a depression amount of the accelerator pedal 30 detected by the accelerator opening sensor 32.

The inverter ECU 26 controls the inverter 20 in accordance with the torque set by the vehicle ECU 22, so that DC power of the battery 18 is converted into AC power by the inverter 20 and supplied to the electric motor 6. Supplied with AC power, the electric motor 6 is operated as a motor to generate a driving torque. The driving torque of the electric motor 6 is transmitted to the driving wheels 16 through the transmission 8, and the vehicle thereby starts traveling.

When a vehicle accelerates after starting and the revolution speed of an electric motor 6 increases to be close to the idle speed of an engine 2, a clutch 4 can be engaged to transmit a driving force of the engine 2 to driving wheels 16. The vehicle ECU 22 obtains a driving torque that should be transmitted to a transmission 8 in accordance with a driving state of the vehicle for further acceleration and subsequent traveling of the vehicle. Furthermore, the vehicle ECU 22 appropriately divided the obtained driving torque between the engine 2 and the electric motor 6, and indicate it to the engine ECU 24 and an inverter ECU 26. At this time, the vehicle ECU 22 performs gear switching control of the transmission 8 and engagement/disengagement control of a clutch 4 associated therewith as required.

Figure 2:
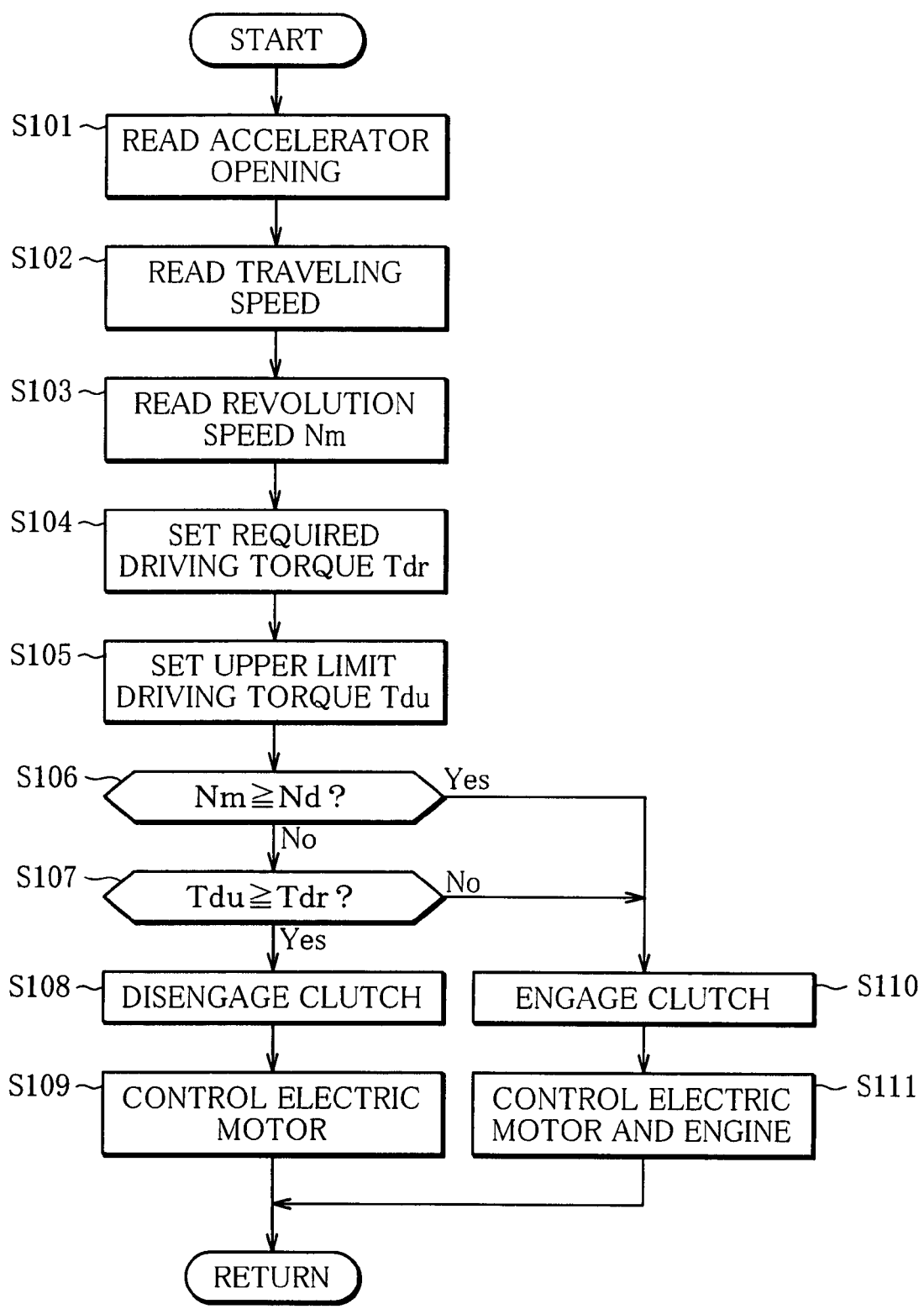
FIG. 2 is a flowchart of driving torque control executed in the hybrid electric vehicle depicted in FIG. 1.

That is, the vehicle ECU 22 performs driving torque control in a predetermined control cycle in accordance with a flowchart depicted in FIG. 2.

When the vehicle ECU 22 starts the driving torque control, the vehicle ECU 22 reads a depression amount of an accelerator pedal 30 detected by the accelerator opening sensor 32 at Step S101, and reads a traveling speed of the vehicle detected by the vehicle speed sensor 34 in subsequent Step S102. In Step S103, the vehicle ECU 22 reads the revolution speed Nm of the electric motor 6 detected by the revolution speed sensor 36, and advances the procedure to Step S104.

At Step S104, the vehicle ECU 22 obtains a total driving torque required for traveling of the vehicle based on the depression amount of the accelerator pedal 30 read in Step S101 and the traveling speed of the vehicle read in Step S102. Moreover, the vehicle ECU 22 sets a required driving torque Tdr as a driving torque that should be transmitted to the transmission 8 based on the total driving torque and a gear currently used in the transmission 8.

Figure 4:
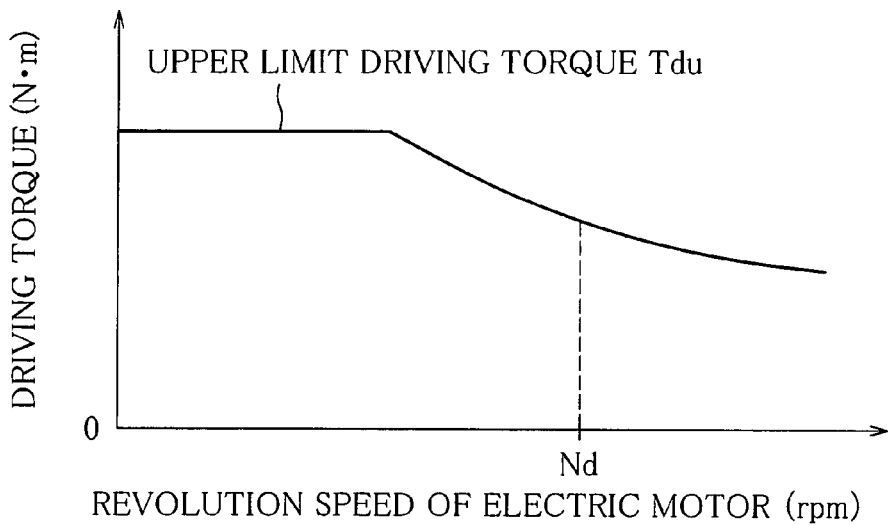
FIG. 4 is a graph showing a relationship between an upper limit driving torque and the revolution speed of an electric motor used in the driving torque control depicted in FIG. 2.

In Step S105, the vehicle ECU 22 sets an upper limit value of a driving torque that can be generated by the electric motor 6 with the revolution speed Nm of the electric motor 6 read in Step S103 as an upper limit driving torque Tdu. The upper limit driving torque Tdu is determined in accordance with the revolution speed of the electric motor 6 based on specifications of the electric motor 6. Although the upper limit driving torque Tdu fluctuates depending on a temperature of the electric motor 6, a temperature of a battery 18, or an SOC, it generally has the following characteristics. That is, the upper limit driving torque Tdu has such characteristics as it has a fixed value in a low revolution speed zone and, on the other hand, it is decreased along with an increase in the revolution speed of the electric motor 6 on a high revolution speed zone as shown in FIG. 4. The vehicle ECU 22 stores such an upper limit driving torque Tdu in a map in advance, reads from the map the upper limit driving torque Tdu corresponding to the revolution speed Nm of the electric motor 6 read in Step S103 to set the upper limit driving torque Tdu.

When the procedure advances to Step S106, the vehicle ECU 22 judges whether the revolution speed Nm of the electric motor 6 read in Step S103 is equal to or higher than a predetermined revolution speed Nd. The predetermined revolution speed Nd is, e.g., 2000 rpm, and set to a region (an fixed output region) where the upper limit driving torque is reduced in accordance with an increase in the revolution speed of the electric motor 6 as shown in FIG. 4. When the revolution speed Nm of the electric motor 6 is lower than the predetermined revolution speed Nd, the vehicle ECU 22 advances the procedure to Step S107, and judges whether the upper limit driving torque Tdu set at Step S105 is equal to or greater than the required driving torque Tdr set at Step S104.

When it is determined that the upper limit driving torque Tdu is equal to or greater than the required driving torque Tdr, the electric motor 6 alone can generate the required driving torque Tdr. Thus, the vehicle ECU 22 forwards the procedure to Step S109, and commands the inverter ECU 26 to generate a driving torque equal to the required driving torque Tdr from the electric motor 6. Then the vehicle ECU 22 ends the current control cycle. Upon receiving this command, the inverter ECU 26 controls the electric motor 6 to perform a motor operation. That is, the inverter ECU 26 adjusts a power supplied to the electric motor 6 from the battery 18 through an inverter 20, and controls the electric motor 6 so as to generate a driving torque equal to the required driving torque Tdr therefrom.

In the next control cycle, the vehicle ECU 22 again reads a depression amount of the accelerator pedal 30, a traveling speed of the vehicle, and the revolution speed Nm of the electric motor 6 at Steps S101 to S103 as explained above. Additionally, the vehicle ECU 22 sets the required driving torque Tdr and the upper limit driving torque Tdu at Steps S104 and S105.

When the vehicle ECU 22 judges that the revolution speed Nm of the electric motor 6 is still lower than the predetermined revolution speed Nd at Step S106, the vehicle ECU 22 advances the procedure to Step S107 and judges whether the upper limit driving torque Tdu is equal to or greater than the required driving torque Tdr.

Therefore, the clutch 4 is maintained in a disengaged state and the electric motor 6 is controlled to generate a driving torque equal to the required driving torque as long as the upper limit driving torque Tdu is equal to or greater than the required driving torque Tdr in a state where the revolution speed Nm of the electric motor 6 is yet to reach the predetermined revolution speed Nd. As a result, the vehicle is driven by using the driving torque from the electric motor 6 alone.

On the other hand, when the upper limit torque Tdu set at Step S105 is smaller than the required driving torque Tdr set at Step S104, the electric motor 6 alone cannot generate a driving torque equal to the required driving torque Tdr. Therefore, the vehicle ECU 22 advances the procedure from Step S107 to Step S110 to engage the clutch 4, and then forwards the procedure to Step S111.

At Step S111, the vehicle ECU 22 indicates to the engine ECU 24 a driving torque that should be generated by the engine 2 and further indicates to the inverter ECU 26 a driving torque that should be generated by the electric motor 6 so as to combine the driving torque from the engine 2 with the driving torque from the electric motor 6 to obtain the required driving torque Tdr. Then the vehicle ECU 22 ends this control cycle. Upon receiving the driving torques set by the vehicle ECU 22, the engine ECU 24 and the inverter ECU 26 control the engine 2 and the electric motor 6, respectively. As a result, both the engine 2 and the electric motor 6 drive the vehicle.

In the next control cycle, the vehicle ECU 22 likewise sets the required driving torque Tdr based on a depression amount of the accelerator pedal 30 and a traveling speed of the vehicle and sets the upper limit driving torque Tdu based on the revolution speed Nm of the electric motor 6 as explained above. When the vehicle ECU 22 judges that the revolution speed Nm of the electric motor 6 is still lower than the predetermined revolution speed Nd at Step S106, the vehicle ECU 22 advances the procedure to Step S107 to judge whether the upper limit driving torque Tdu is equal to or greater than the required driving torque Tdr.

When the upper limit driving torque Tdu is still smaller than the required driving torque Tdr, a engaged state of the clutch 4 is maintained, and control is executed in such a manner that a sum of the driving torque from the engine 2 and the driving torque from the electric motor 6 becomes equal to the required driving torque, as explained above. As a result, both the engine 2 and the electric motor 6 are used to drive the vehicle.

When the upper limit driving torque Tdu becomes equal to or greater than the require driving torque Tdr, the vehicle ECU 22 forwards the procedure to Step S108 as explained above to disengage the clutch 4, and the electric motor 6 alone is thereby used to drive the vehicle.

In this manner, in the situation where the revolution speed Nm of the electric motor 6 does not reach the predetermined revolution speed Nd, a engagement/disengagement state of the clutch 4 is controlled based on whether the upper limit driving torque Tdu is equal to or greater than the required driving torque Tdr, and a driving state using both the engine 2 and the electric motor 6 is thereby switched to/from a driving state using the electric motor 6 alone.

On the other hand, when the revolution speed Nm of the electric motor 6 read at Step S103 becomes equal to or higher than the predetermined revolution speed Nd, the vehicle ECU 22 advances the procedure from Step S106 to Step S110 to engage the clutch 4 without forwarding the procedure to Step S107. Further, at Step S111, the engine 2 and the electric motor 6 are controlled in such a manner that a sum of the driving torque from the engine 2 and the driving torque from the electric motor 6 becomes equal to the required driving torque. In the next and subsequent control cycles, the vehicle ECU 22 advances the procedure from Step S106 to Step S110 to maintain engagement of the clutch 4 as long as the revolution speed Nm of the electric motor 6 is equal to or higher than the predetermined revolution speed Nd. Moreover, at Step S111, the engine 2 and the electric motor 6 are controlled in such a manner that a sum of the driving torque from the engine 2 and the driving torque from the electric motor 6 becomes equal to the required driving torque.

In this manner, when the revolution speed Nm of the electric motor 6 is equal to or higher than the predetermined revolution speed Nd, the clutch 4 is engaged and the engine 2 rotates with the same revolution speed as that of the electric motor 6 in a case where the upper limit driving torque Tdu is equal to or greater than the required driving torque Tdr as well as a case where the upper limit driving torque Tdu is smaller than the required driving torque Tdr.

Therefore, when a traveling speed is increased to thereby raise the revolution speed of the electric motor 6 while maintaining a state where the required driving torque Tdr is relatively small, e.g., when the vehicle is traveling down a sloping road, an increase in the revolution speed Nm of the electric motor 6 to be equal to or higher than the predetermined revolution speed Nd allows the clutch 4 to be engaged even if the upper limit driving torque Tdu is equal to or greater than the required driving torque Tdr. The clutch 4 is engaged before the revolution speed of the electric motor 6 becomes too high in this manner, thereby eliminating a sudden increase in the revolution speed of the engine 2 caused due to engagement of the clutch 4 that occurs when the required driving torque Tdr exceeds the upper limit driving torque Tdu in a state where the revolution speed of the electric motor 6 is high. As a result, a driving feeling can be improved.

It is to be noted that the vehicle ECU 22 performs control of switching gears of the transmission 8 as required besides the driving torque control, and it carries out engagement/disengagement control of the clutch 4 at this moment as required. Such engagement/disengagement control of the clutch 4 effected in association with the switching of gears is carried out independently from the driving torque control.

An example where depression of the accelerator pedal 30 is released and the vehicle travels while reducing a speed will now be explained hereinafter.

Figure 3:
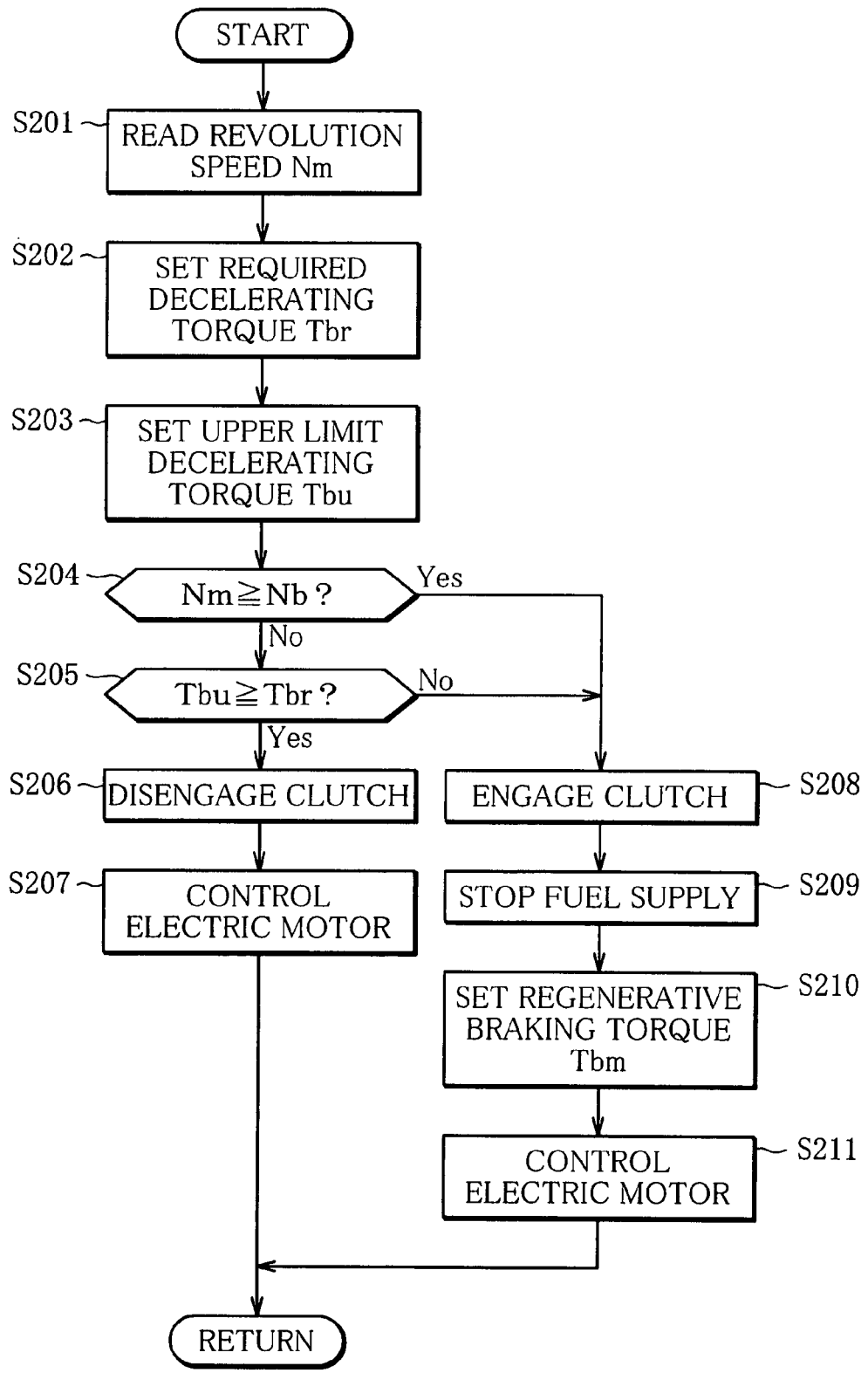
FIG. 3 is a flowchart of decelerating torque control executed in the hybrid electric vehicle depicted in FIG. 1.

When depression of the accelerator pedal 30 is released, the vehicle ECU 22 stops the driving torque control, and carries out decelerating torque control in a predetermined control cycle in accordance with a flowchart of FIG. 3. At this time, the vehicle ECU 22 performs gear switching control of the transmission 8 and engagement/disengagement control of the clutch 4 associated therewith as required.

When the vehicle ECU 22 starts the decelerating torque control, the vehicle ECU 22 first reads the revolution speed Nm of the electric motor 6 detected by the revolution speed sensor 36 at Step S201, and advances the procedure to Step S202.

At Step S202, the vehicle ECU 22 sets a decelerating torque that should be transmitted to the transmission 8 in order to obtain a suitable deceleration of the vehicle as a required decelerating torque Tbr based on the revolution speed Nm of the electric motor 6 read at Step S201 and a gear currently used by the transmission 8.

Figure 5:
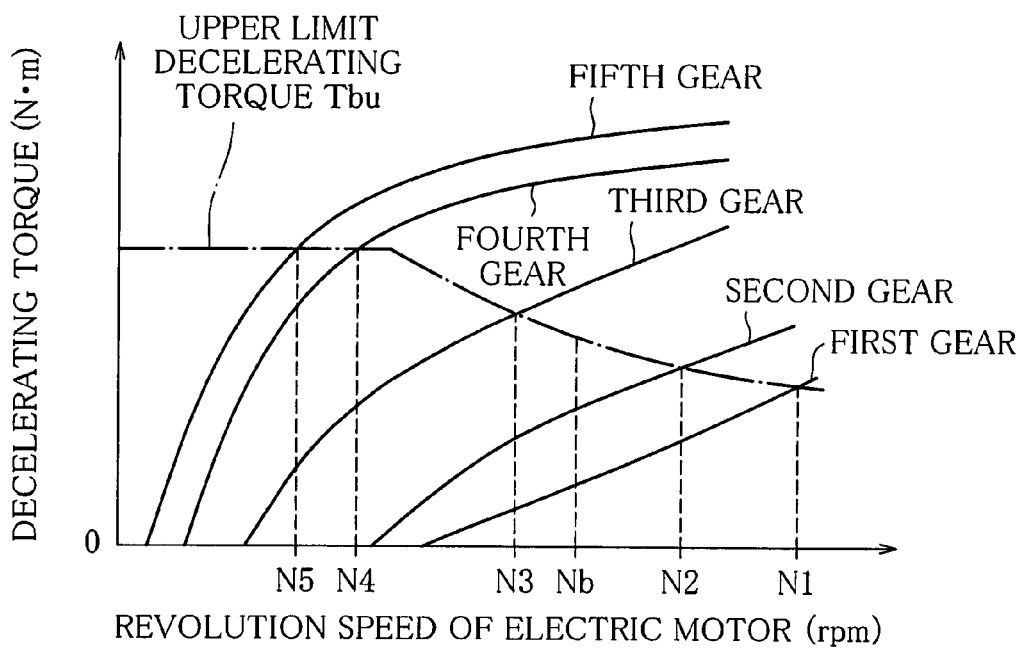
FIG. 5 is a graph showing a relationship between an upper limit decelerating torque and the revolution speed of an electric motor used in the decelerating torque control depicted in FIG. 3.

The required decelerating torque Tbr is individually set in accordance with each gear of the transmission 8 based on the revolution speed of the electric motor 6 as indicated by a solid line in FIG. 5. It is to be noted that the required decelerating torque is represented as a negative value when the driving torque has a positive value, but an absolute value of the required decelerating torque will be explained below unless specified in particular. It is assumed that the required decelerating torque depicted in FIG. 5 is also represented as an absolute value thereof.

Further, as shown in FIG. 5, a larger required decelerating torque Tbr is set when a gear on the higher speed side is used.

When a larger required decelerating torque is set as a gear on the higher speed side is used, a difference in required decelerating torque transmitted to the driving wheels through the transmission 8 between the gears can be reduced, thus decreasing a difference in deceleration obtained at the time of deceleration between the respective gears. Furthermore, a speed change shock at the time of downshift can be reduced.

The vehicle ECU 22 stores such a required decelerating torque Tbr in a map in advance, reads from the map the required decelerating torque Tbr corresponding to the revolution speed Nm of the electric motor 6 read at Step S201 and a currently used gear, and sets the required decelerating torque.

At Step S203, the vehicle ECU 22 sets an upper limit value of a regenerative braking torque that can be generated by the electric motor 6, as an upper limit decelerating torque Tbu, at the revolution speed Nm of the electric motor 6 read at Step S201. This upper limit decelerating torque Tbu is determined in accordance with the revolution speed of the electric motor 6 based on specifications of the electric motor 6. Although the upper limit decelerating torque Tbu fluctuates depending on a temperature of the electric motor 6, a temperature of the battery 18, or an SOC, it generally has the following characteristics. That is, the upper limit decelerating torque Tbu has such characteristics as it has a fixed value in a low revolution speed zone and, on the other hand, it decreases along with an increase in the revolution speed of the electric motor 6 on a high revolution speed side as indicated by a chain line in FIG. 5.

It is to be noted that the upper limit decelerating torque Tbu is also represented as a negative value like the required decelerating torque Tbr, but an absolute value of the upper limit decelerating torque Tbu will be explained below unless specified in particular. The upper limit decelerating torque Tbu depicted in FIG. 5 is also represented as an absolute value thereof.

As shown in FIG. 5, the required decelerating torque Tbr corresponding to a first gear is equal to or smaller than the upper limit decelerating torque Tbu when the revolution speed of the electric motor 6 is equal to or smaller than N1, and it is greater than the upper limit decelerating torque Tbu when the revolution speed of the electric motor 6 is higher than N1. In regard to each of the required decelerating torques Tbr corresponding to the respective gears, i.e., a second to a fifth gears, likewise, a magnitude relationship with respect to the upper limit decelerating torque Tbu is reversed when the revolution speed of the electric motor 6 is N2, N3, N4, or N5.

The vehicle ECU 22 stores such an upper limit decelerating torque Tbu in a map in advance, and reads from the map the upper limit decelerating torque Tbu corresponding to the revolution speed Nm of the electric motor 6 read at Step S201 to set the read upper limit decelerating torque.

When the vehicle ECU 22 advances the procedure to Step S204, the vehicle ECU 22 judges whether the revolution speed Nm of the electric motor 6 read at Step S201 is equal to or higher than a predetermined revolution speed Nb. This predetermined revolution speed Nb is, e.g., 2000 rpm like the predetermined revolution speed Nd in the driving torque control explained above. In this embodiment, the predetermined revolution speed Nb is lower than the revolution speed N2 of the electric motor 6 at which the required decelerating torque Tbr corresponding to the second gear is equal to the upper limit decelerating torque Tbu, and it is higher than the revolution speed N3 of the electric motor 6 at which the required decelerating torque Tbr corresponding to the third gear is equal to the upper limit decelerating torque Tbu.

When the revolution speed Nm of the electric motor 6 is lower than the predetermined revolution speed Nb, the vehicle ECU 22 forwards the procedure to Step S205 to judge whether the upper limit decelerating torque Tbu set at Step S203 is equal to or greater than the required decelerating torque Tbr set at Step S202.

When the vehicle ECU 22 judges that the upper limit decelerating torque Tbu is equal to or greater than the required decelerating torque Tbr, the electric motor 6 alone can generate the required decelerating torque Tbr. Therefore, the vehicle ECU 22 advances the procedure to Step S206 to disengage the clutch 4. Moreover, the vehicle ECU 22 command the inverter ECU 26 to generate a regenerative braking torque equal to the required decelerating torque Tbr from the electric motor 6 at a step S207, and the vehicle ECU22 ends the current control cycle. Upon receiving this command, the inverter ECU 26 controls the electric motor 6 to operate as a generator. That is, the inverter ECU 26 adjusts a power supplied to the battery 18 from the electric motor 6 through the inverter 20, and controls the electric motor 6 in such a manner that the electric motor 6 can generate the regenerative braking torque equal to the required decelerating torque Tbr.

In the next control cycle, the vehicle ECU 22 again reads the revolution speed Nm of the electric motor 6 at Step S201 as explained above, and sets the required decelerating torque Tbr and the upper limit decelerating torque Tbu at Steps S202 and S203.

When the vehicle ECU22 judges that the revolution speed Nm of the electric motor 6 is still lower than the predetermined revolution speed Nb at Step S204, the vehicle ECU 22 advances the procedure to Step S205 to judge whether the upper limit decelerating torque Tbu is equal to or greater than the required decelerating torque Tbr.

Therefore, the clutch 4 is maintained in the disengaged state and the electric motor 6 is controlled to generate the regenerative braking torque equal to the required decelerating torque Tbr as long as the upper limit decelerating torque Tbu is equal to or greater than the required decelerating torque Tbr in a state where the revolution speed Nm of the electric motor 6 is yet to reach the predetermined revolution speed Nb. As a result, the vehicle decelerates.

On the other hand, when the upper limit decelerating torque Tbu set at Step S203 is smaller than the required decelerating torque Tbr set at Step S202, the electric motor 6 alone cannot generate the regenerative braking torque equal to the required decelerating torque. Therefore, the vehicle ECU 22 advances the procedure to Step S208 from Step S205 to engage the clutch 4, and then forwards the procedure to Step 209.

At Step S209, the vehicle ECU 22 commands the engine ECU 24 to stop fuel supply to the engine 2, and the engine ECU 24 stops the fuel supply to the engine 2 in response to this command.

At Step S210, the vehicle ECU 22 subtracts a decelerating torque generated by the engine 2 due to the fuel supply stop at Step S209 from the required decelerating torque Tbr set at Step S202 to set a regenerative braking torque Tbm that should be generated by the electric motor 6, and advances the procedure to Step S211.

At Step S211, the vehicle ECU 22 commands the inverter ECU 26 in such a manner that the electric motor 6 generates the regenerative braking torque Tbm set at Step S210 as explained above, and the inverter ECU 26 controls the electric motor 6 in response to this command. Then the vehicle ECU 22 ends this control cycle.

As a result, the decelerating torque generated by the engine 2 to which the fuel supply is stopped and the regenerative braking torque Tbm of the electric motor 6 that is operated as a generator are transmitted to the transmission 8, and further transmitted to the driving wheels 16 after speed-changed in the transmission 8. Thereby the vehicle decelerates. At this time, a sum of the decelerating torque of the engine 2 and the regenerative braking torque Tbm of the electric motor 6 is equal to the required decelerating torque Tbr, and hence the vehicle decelerates with an appropriate deceleration.

In the next control cycle, the vehicle ECU 22 likewise sets the required decelerating torque Tbr and the upper limit decelerating torque Tbu as explained above. When the vehicle ECU22 judges that the revolution speed Nm of the electric motor 6 is still lower than the predetermined revolution speed Nb at Step S204, the vehicle ECU 22 advances the procedure to Step S205 to judge whether the upper limit decelerating torque Tbu is equal to or greater than the required decelerating torque Tbr.

When the upper limit decelerating torque Tbu is still smaller than the required decelerating torque Tbr, the vehicle ECU 22 maintains the engaged state of the clutch 4 as explained above. Moreover, the engine 2 and the electric motor 6 are controlled in such a manner that a sum of the decelerating torque of the engine 2 and the regenerative braking torque of the electric motor 6 becomes equal to the required decelerating torque Tbr. As a result, both the engine 2 and the electric motor 6 are used to decelerate the vehicle.

When the upper limit decelerating torque Tbu is equal to or greater than the required decelerating torque Tbr, the vehicle ECU 22 advances the procedure to Step S206 as explained above to disengage the clutch 4, and a regenerative braking force of the electric motor 6 alone is transmitted to the transmission 8. Thus the vehicle decelerates.

In this manner, in a situation where the revolution speed Nm of the electric motor 6 is yet to reach the predetermined revolution speed Nb, the engagement/disengagement state of the clutch 4 is controlled based on whether the upper limit decelerating torque Tbu is equal to or greater than the required decelerating torque Tbr, and a decelerating state using both the engine 2 and the electric motor 6 is thereby switched to/from a decelerating state using the electric motor 6 alone.

On the other hand, when the revolution speed Nm of the electric motor 6 read at Step S201 is equal to or higher than the predetermined revolution speed Nm, the vehicle ECU 22 advances the procedure to Step S208 from Step S204 to engage the clutch 4 without forwarding the procedure to Step S205. Further, the vehicle ECU 22 stops the fuel supply to the engine 2 at Step S209, and the engine 2 and the electric motor 6 are controlled in such a manner that a sum of decelerating torque of the engine 2 and the regenerative braking torque of the electric motor 6 becomes equal to the required decelerating torque Tbr at Steps S210 and S211 as explained above. In the next and subsequent cycles, the vehicle ECU 22 likewise advances the procedure to Step S208 from Step S204 to maintain the engaged state of the clutch 4 as long as the revolution speed Nm of the electric motor 6 is equal to or higher than the predetermined revolution speed Nb. Moreover, the vehicle ECU 22 stops the fuel supply to the engine 2 at Step S209, and the engine 2 and the electric motor 6 are controlled in such a manner that a sum of the decelerating torque of the engine 2 and the regenerative braking torque of the electric motor 6 becomes equal to the required decelerating torque Tbr at Steps S210 and S211.

In this manner, in a situation where the revolution speed Nm of the electric motor 6 is equal to or higher than the predetermined revolution speed Nb, the clutch 4 is engaged and the engine 2 rotates with the same revolution speed as that of the electric motor 6 when the upper limit decelerating torque Tbu is equal to or greater than the required decelerating torque Tbr as well as when the upper limit decelerating torque Tbu is smaller than the required decelerating torque Tbr.

For example, it is assumed that, when the vehicle changes to deceleration traveling while traveling down a sloping road with the second gear, the upper limit decelerating torque Tbu is first equal to or greater than the required decelerating torque Tbr corresponding to the second gear and the clutch 4 is in the disengaged state. In this case, the clutch 4 is engaged when the revolution speed of the electric motor 6 rises to reach the predetermined revolution speed Nb along with an increase in a traveling speed, i.e., before the revolution speed of the electric motor 6 rises to the revolution speed N2 at which the upper limit decelerating torque Tbu becomes equal to the required decelerating torque Tbr corresponding to the second gear.

The clutch 4 is engaged before the revolution speed of the electric motor 6 becomes too high in this manner, and this thereby eliminates a sudden increase in the revolution speed of the engine 2 due to engagement of the clutch 4 caused when the required decelerating torque Tbr exceeds the upper limit decelerating torque Tbu in a state where the revolution speed of the electric motor 6 is high. As a result, a driving feeling can be improved even during deceleration traveling.

Such an effect can be also obtained in the case where the first gear is used and the upper limit decelerating torque Tbu is smaller than the required decelerating torque Tbr when the revolution speed of the electric motor 6 exceeds N1 as shown in FIG. 5.

Moreover, when the third to the fifth gears are used, the upper limit decelerating torque Tbu becomes smaller than the required decelerating torque Tbr before the revolution speed of the electric motor 6 reaches the predetermined revolution speed Nb, thereby engaging the clutch 4. Therefore, the revolution speed of the engine 2 is not considerably increased at the time of engaging the clutch 4.

It is to be noted that the vehicle ECU 22 performs control of switching the gears in the transmission 8 in a deceleration of the vehicle as required besides the decelerating torque control and, at this time, carries out control of engagement/disengagement of the clutch 4 as required. Such control of engagement/disengagement of the clutch 4 effected in association with switching the gears is performed independently from the decelerating torque control.

This is the end of explanation about the control device of a hybrid electric vehicle according to the embodiment of the present invention, but the prevent invention is not restricted to the foregoing embodiment.

For example, in the above-explained embodiment, both the driving torque control when transmitting a driving torque to the driving wheels 16 and the decelerating torque control when transmitting a decelerating torque to the same are executed to engage the clutch 4 when the revolution speed Nm of the electric motor 6 becomes equal to or higher than the predetermined revolution speed Nd or Nb. However, one of the driving torque control and the decelerating torque control alone may be carried out.

That is, for example, in a case where the clutch 4 is engaged when driving by the engine 2 is enabled without judging a magnitude relationship between the upper limit driving torque and the required driving torque as to the driving torque, the decelerating torque control alone may be executed. Alternatively, when the decelerating torque control at the time of deceleration is effected in a conformation different from the foregoing embodiment, the driving torque control alone may be carried out.

In the foregoing embodiment, both the predetermined revolution speed Nd required to engage the clutch 4 in the driving torque control and the predetermined revolution speed Nb required to engage the clutch 4 in the decelerating torque control are 2000 rpm. However, the predetermined revolution speed Nd and the predetermined revolution speed Nb are not restricted to this value, and they can be appropriately changed. They may be different revolution speed.

In case of the decelerating torque in particular, when the gear is the first gear or the second gear, the clutch 4 is engaged before the upper limit decelerating torque becomes smaller than the required decelerating torque in the foregoing embodiment. However, adjusting the predetermined revolution speed Nb may be adjusted so that the clutch 4 is engaged before the upper limit decelerating torque becomes smaller than the required decelerating torque even if the gear is a gear for a higher speed, or so that the clutch 4 is engaged before the upper limit decelerating torque becomes smaller than the required decelerating torque only when the gear is the first gear.

In the foregoing embodiment, the fuel supply to the engine 2 is stopped at the time of simultaneous use of the decelerating torque of the engine 2. In addition to this, an exhaust braking device may be provided in an exhaust path of the engine 2 so that a larger decelerating torque can be obtained by operating this exhaust braking device.

In the foregoing embodiment, the upper limit driving torque Tdu, the required driving torque Tdr, the upper limit decelerating torque Tbu, or the required decelerating torque Tbr is set in accordance with the revolution speed of the electric motor 6 detected by the revolution speed sensor 36. However, a revolution speed that varies in accordance with the revolution speed of the electric motor 6, e.g., the output revolution speed of the transmission 8 may be detected in place of the revolution speed of the electric motor 6, and this revolution speed may be converted into the revolution speed of the electric motor 6 and then used.

It is to be noted that the engine 2 is a diesel engine in the foregoing embodiment, but an engine type is not restricted thereto, and a gasoline engine and others may be used.

The electric motor 6 is a permanent-magnetic synchronous motor in the above-explained embodiment, but an electric motor type is not restricted thereto. The electric motor 6 that can be operated as a motor and as a generator can suffice.

The transmission 8 is an automatic transmission having five-speed forward gears in the foregoing embodiment, but the number of gears or a type of the transmission is not restricted thereto. The transmission 8 may be a continuously variable transmission or a manual transmission, for example.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control device for a hybrid electric vehicle arranged such that a driving force of an engine and a driving force of an electric motor can be transmitted to driving wheels, and that the engine and the driving wheels can be mechanically connected and disconnected by means of a clutch, comprising:

revolution speed detecting means for detecting a revolution speed of the electric motor; and control means for setting an upper limit torque as a torque that is generable by the electric motor in accordance with the revolution speed detected by the revolution speed detecting means, and setting a required torque that should be output from at least one of the engine and the electric motor as a torque required for traveling of the vehicle, wherein the control means disengages the clutch and controls the electric motor to generate the required torque when the upper limit torque is equal to or greater than the required torque, and, on the other hand, engages the clutch and controls the engine and the electric motor in such a manner that a sum of a torque of the engine and a torque of the electric motor becomes the required torque when the upper limit torque is smaller than the required torque, and wherein the control means engages the clutch even if the upper limit torque is equal to or greater than the required torque when the revolution speed detected by the revolution speed detecting means becomes equal to or higher a predetermined revolution speed during traveling of the vehicle.

2. The control device for a hybrid electric vehicle according to claim 1, wherein:

the upper limit torque is an upper limit decelerating torque that is generable by the electric motor with the revolution speed detected by the revolution speed detecting means when a driver of the vehicle executes a decelerating operation; and the required torque is a required decelerating torque determined based on the decelerating operation.

3. The control device for a hybrid electric car according to claim 2, wherein:

the hybrid electric vehicle comprises a transmission that is interposed between output shafts of the engine and the electric motor and the driving wheels and has a plurality of gears; and the required decelerating torque is individually set in accordance with each gear in the transmission based on the revolution speed detected by the revolution speed detecting means, the required decelerating torque that corresponds to a higher-speed gear having a larger value in at least a part of a revolution speed region of the electric motor where the required decelerating torque is set.

4. The control device for a hybrid electric car according to claim 1, wherein:

the upper limit torque is an upper limit driving torque that is generable by the electric motor with the revolution speed detected by the revolution speed detecting means; and the required torque is a required driving torque that is necessary for driving the vehicle.

* * * * *